3,376,214
HYDROFORMING PROCESS WITH MORDENITE, ALUMINA AND PLATINUM CATALYST
Ralph J. Bertolacini, Chesterton, and Harry M. Brennan, Hammond, Ind., assignors to Standard Oil Company, Chicago, Ill., a corporation of Indiana
Filed Sept. 28, 1965, Ser. No. 490,792
3 Claims. (Cl. 208—89)

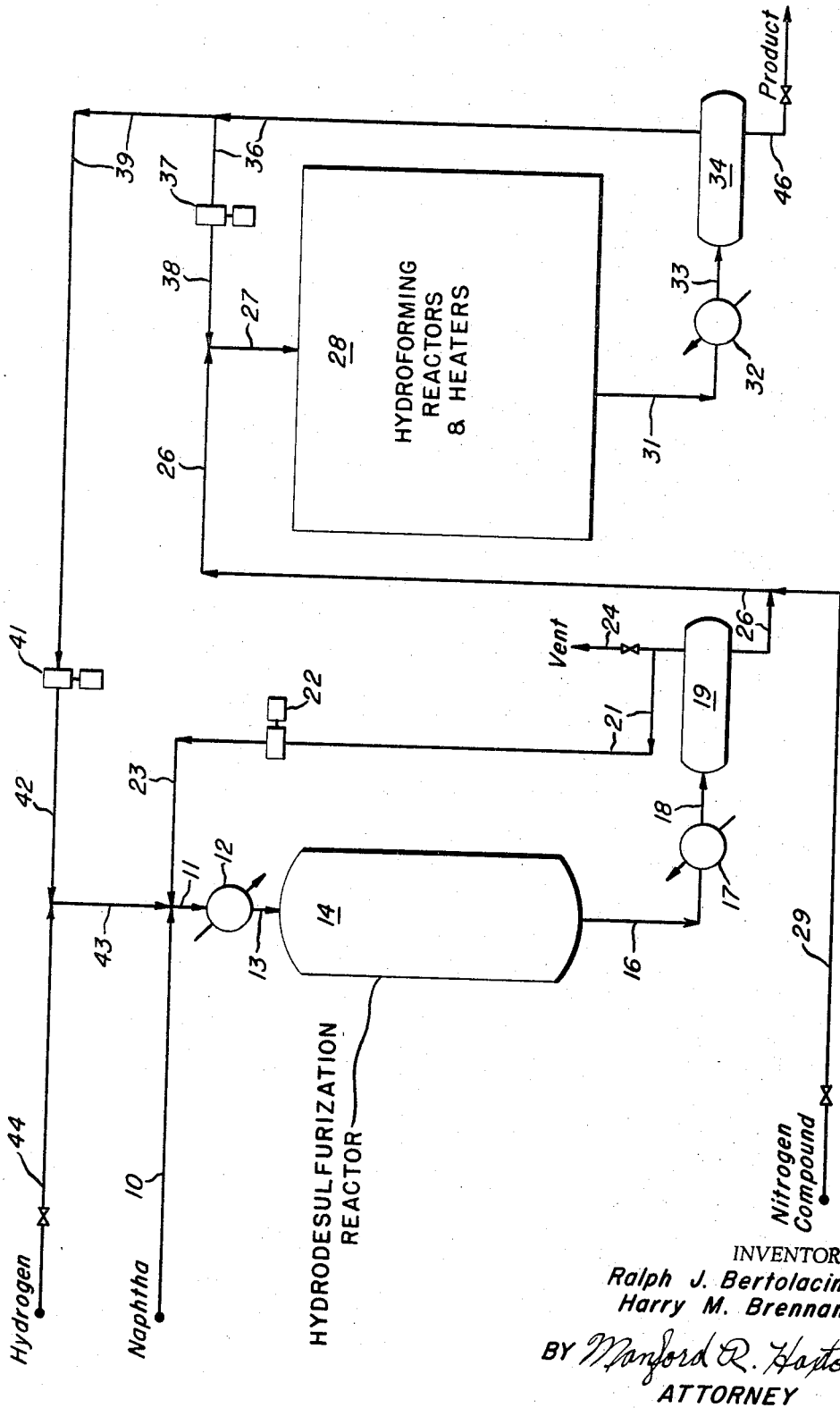

This invention relates to hydrocarbon conversion processes and more particularly, to naphtha hydroforming processes utilizing catalysts which contain a particular form of zeolite.

Patinum-alumina-halogen catalysts are in successful commercial use in the conversion of low-octane petroleum naphthas under hydroforming conditions into gasolines of high anti-knock rating. In a typical platinum-hydroforming process, a mixture of charging stock which has been treated to remove sulfur and nitrogen compounds, and hydrogen-containing gas is passed through a bed of platinum-alumina-halogen catalyst containing between about 0.05 to 1% by weight each of platinum and a halogen, usually chlorine. The hydroforming reactions are carried out at a temperature in the range of about 800 to 1000° F., a total pressure between about 100 and 1200 pounds per square inch gauge, a hydrogen partial pressure between about 50 and 1000 pounds per square inch, a hydrogen rate of 2,000 to 10,000 standard cubic feed per barrel of charging stock, and a weight hourly space velocity between about 0.5 and 10. Various techniques of halogen addition are used to replace halogen lost from the catalyst during processing.

The activity and selectivity of hydrocarbon conversion catalysts depend upon a variety of factors, such as the identity and condition of the catalyst components, the mode of catalyst preparation, the presence or absence of of promotors and modifiers, the presence or absence of contaminating materials in the charging stock and the proportion thereof, the conversion temperature, the hydrogen partial pressure in the conversion zone, and the like. The commercial catalysts are prepared by commingling a Group VIII metal compound (Group VIII in the Periodic Table of the elements) with a hydrous adsorbent refactory inorganic oxide, such as alumina, and thereafter drying and calcining. A new hydroforming process has now been discovered which utilizes a more active, yet halogen-free, catalyst and which produces a high yield of reformate.

Accordingly, this invention provides an improved hydroforming process which comprises contacting hydrodesulfurized hydroforming feed naphtha boiling generally in the range of 150 to 400° F. and containing 1 to 100 p.p.m. by weight of combined nitrogen with a catalyst consisting essentially of 0.01 to 10 wt. percent of a Group VIII metal, 0.1 to 25 wt. percent of mordenite structure zeolite, and 75 to 99.9 wt. percent of alumina. The support contains, preferably, about 0.5 to 5 wt. percent of the mordenite. Group VIII metals which are particularly useful in the catalyst are the noble metals. Platinum is a preferred Group VIII metal.

In another aspect, the invention provides an improved naphtha hydroforming process which comprises hydrodesulfurizing feed naphtha, preferably utilizing hydrogen from the hydroformer described below, to reduce the sulfur content of said naphtha to less than about 50 p.p.m by weight, adding 1 to 100 p.p.m. by weight of combined nitrogen to the desulfurized naphtha and contacting the combined nitrogen-containing naphtha in the presence of hydrogen under hydroforming conditions with a catalyst consisting essentially of 0.01 to 10 wt. percent of Group VIII metal on a support containing 0.1 to 15 wt. percent mordenite zeolite and 85 to 99.9 wt. percent alumina. The mordenite zeolite may be in a form selected from the class consisting of the unexchanged cation form and ion exchanged form containing at least one of the following cations: cations of Group I metals, cations of Group II metals, cations of Group III metals, ammonium ions, hydrogen ions.

The figure depicts a simplified schematic flow diagram of a preferred embodiment of the process of the present invention.

By the term "combined nitrogen" is meant compounds of nitrogen, suitably basic nitrogen compounds such as, for example, ammonia, amines, etc., preferably organic nitrogen compounds.

The process of this invention is especially advantageous in the hydroforming of petroleum naphthas boiling in the range of about 150 to 400° F. and is capable of upgrading a 50% naphthenic naphtha having a research octane number of only 40 to 50 into a $C_5+$ gasoline having a Research octane number of 90 to 100 in a yield of 75 to 90%. Still higher $C_5+$ octane rating reformate may be produced at somewhat reduced yield as the octane is increased above 100.

The reforming or hydroforming of various hydrocarbon fractions simultaneously effects a group of reactions, including the production 6-membered ring naphthenes from other naphthenes by isomerization, dehydrogenation of naphthenes to form aromatics, cyclization of paraffins to form aromatics, isomerization of straight-chain paraffins to form branched-chain paraffins, cracking of paraffins to carbon and to unsaturated fragments of lower molecular weight, hydrogenation of carbon and of the unsaturated fragments, and various side reactions. All of these reactions tend to produce products containing motor-fuel fractions of improved anti-knock rating.

In utilizing the new process of this invention for the continuous reforming of hydrocarbons, a feed stock consisting essentially of a virgin naphtha, a cracked naphtha, or a mixture thereof, boiling within the range of about 70 to about 500° F., and preferably within the range of about 180 to 400° F. is contacted in the vapor phase with the catalyst at a temperature within the range of about 800 to 1050° F., the average temperature throughout the catalyst bed being maintained within the range of about 875 to 950° F., preferably around 900° F. The process is operated at a pressure within the range of about 200 to 1000 pounds per square inch, preferably from about 200 to 400 pounds per square inch. Hydrogen is included within the reaction zone, ordinarily by recycle, in the range of about 2 to 8 moles of hydrogen per mole of feed, preferably between about 3 and 6 moles per mole. It is preferred to adjust the composition of the catalyst and to adjust the operating conditions so that there is at least a small net production of hydrogen, the introduction of hydrogen from an outside source being thereby rendered unnecessary. This can conveniently be effected for a given catalyst composition by adjusting the proportion of naphthenes in the charging stock to produce at least enough hydrogen to saturate the materials produced by the paraffin-cracking reactions and to provide for the normal venting requirements.

The new process can be carried out in any of the conventional types of equipment known to the art. One may, for example, employ catalyst in the form of pills, pellets, granules, broken fragments, or various special shapes, disposed as a fixed bed within a reaction zone, and the charging stock may be passed therethrough in the liquid, vapor, or mixed phase, and in either upward or downward flow. Alternatively, the catalyst may be in a suitable form for use in the moving beds, in which the charging stock and catalyst are preferably passed in countercurrent flow; or in fluidized-solid processes, in which the charging stock is passed upward through a turbulent bed of finely divided catalyst; or in the suspensoid process, in which the catalyst is slurried in the charging stock and the resulting mixture is conveyed into the reaction zone. The preferred process is exemplified by Ultraforming (Petroleum Engineer, vol. XXVI, No. 4, April 1954, at page C-35). The reaction products from any of the foregoing processes are separated from the catalyst and fractionated to recover the various components. The hydrogen and unconverted materials are recycled as desired, the excess hydrogen produced in the reformer conveniently utilized in the hydrodesulfurization of the feed.

The catalysts of this invention are superior in stability, especially under adverse conditions which seriously impair the activity of prior-art catalyst. An important advantage of the catalysts employed in this invention over prior-art catalysts is that no halogen is required, thus attendant corrosion problems and halogen level maintenance problems are avoided.

The zeolite employed in the catalyst of this invention is a particular form of zeolite known as mordenite. While mordenite is naturally occurring, a synthetic mordenite known as zeolon has become available commercially from the Norton Company. Mordenite is characterized by its high silicon to aluminum ratio of about 5:1 and its crystal structure. Composition of mordenite as given in Kirk-Othmer, "Encyclopedia of Chemical Technology," vol. 12, page 297, is $(Ca, Na_2)Al_2Si_9O_{22}6H_2O$. The proposed structure is one in which the basic building block is a tetrahedron consisting of one silicon or aluminum atom surrounded by four oxygen atoms. The crystal is made up of chains of 4- and 5-membered rings of these tetrahedra. These 4- and 5-membered rings are believed to give the structure its stability. The chains are linked together to form a network having a system of large parallel channels interconnected by small cross channels. Rings of 12 tetrahedra form the large channels. Other synthetic zeolites also have such 12-membered rings but they have interconnected cages whereas the mordenite has parallel channels of uniform diameter. For example, synthetic faujasite, which has the formula $Na_3Al_3Si_4O_{14}$, is characterized by a 3-dimensional array of pores which consist of 12–13 A. cages interconnected through 8–9 A. windows.

The mordenite zeolite in the catalyst employed in the process of the present invention may be in the unexchanged cation form containing exchangeable sodium and/or calcium ions or, other alkali metal, alkaline earth metal, or, preferably the alkali metal cations may be replaced with hydrogen ions such as by exchanging the alkali metal ions with ammonium ions and then heating to drive off ammonia leaving the mordenite in the hydrogen form. Mordenite differs from other zeolites in that substantially all the exchangeable metal cations may be replaced with hydrogen ions without causing destruction of the charcteristic crystal structure.

The catalyst for the process of this inventon is prepared by forming an adsorbent refractory cocatalytic support material consisting essentially of about 0.1 wt. percent to about 25 wt. percent of mordenite structure zeolite and about 75 wt. percent to about 99.9 wt. percent of alumina and incorporating with said support material about 0.01 to about 10 wt. percent of a Group VIII metal or compound thereof. The catalyst composition for the process of the present invention may be formulated in various ways. For example, finely divided mordenite zeolite may be stirred into alumina sol, a soluble non-halogen Group VIII metal compound such as, for example

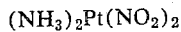

added to the sol, and the sol mixture cogelled by addition of dilute ammonia and the resulting solid dried and calcined. Another way of preparing the catalyst is by mixing finely divided mordenite zeolite into alumina sol as above, gelling the sol by addition of dilute ammonia to produce a gel which is then dried and pelleted. The pellets are then calcined, cooled and then impregnated with a Group VIII metal solution. A third method for making the catalyst is to blend an alumina hydrogel and finely divided mordenite zeolite and adding to this blend a solution of the Group VIII metal and thoroughly blending the mixture. The resulting gel mixture is then dried, pelleted and the pellets calcined. Suitable drying conditions for use in the various catalyst manufacturing methods include a temperature in the range of about 200 to 400° F. for a time in the range of about 5 to 30 hours. Suitable calcination conditions include a temperature in the range of about 900 to 1500° F. for a time of about 2 to 20 hours. Preferred drying and calcining conditions are a temperature of about 250° F. to about 16 hours and a temperature of about 1,000° F. for about 6 hours, respectively.

Components such as halogen, for example, other than Group VIII metals, mordenite structure zeolite, alumina and the Groups I, II, and/or III metals and/or hydrogen may be present in the catalyst composition in minor amounts, usually less than about 1.0%, provided they do not exhibit undesirable physical or chemical effects on the catalyst or the process employing the same.

With reference to the figure a preferred embodiment of the process of the invention will be described. Feed naphtha is fed through line 10 into line 11 where it is combined with hydrogen, heated in preheater 12 to hydrodesulfurization temperature and passed via line 13 into reactor 14 which contains hydrodesulfurization catalyst such as, for example, cobalt and molybdenum on alumina. Suitable operating hydrodesulfurization conditions to be employed in reactor 14 include a temperature in the range of 600 to 850° F., generally about 700–750° F., a pressure in the range of about 300 to 1200 p.s.i.g., generally about 70–900 p.s.i.g., and a weight hourly space velocity in the range of about 1 to 10 w.h.s.v.

The catalyst employed in reactor 14 may be any known desulfurization catalyst and in this case is conventional cobalt-molybdenum supported on alumina, the catalyst having a pill size of about ⅛ inch by ⅛ inch, and a bulk density of about 60 pounds per cubic foot. Since hydrodesulfurization catalysts of this type and their equivalents are well known, no further description thereof is necessary.

Operating conditions of the desulfurizer may be chosen so that sulfur removal is essentially complete to minimize corrosion in the downstream equipment, but nitrogen removal is incomplete since the particular reforming catalyst employed in this invention is not harmed by nitrogen-containing feed and, in fact, selectivity and activity surprisingly are improved.

Effluent from the reactor 14 is passed via line 16, cooler 17, and line 18 into gas-liquid separator 19. Hydrogen-containing gas is withdrawn from separator 19 and passed via line 21, compressor 22 and line 23 to admixture with feed and make-up hydrogen-containing gas in line 11. Excess gas is vented from the system via valved line 24 to maintain system pressure.

Liquid desulfurized naphtha from separator 19 is passed via lines 26 and 27 to the hydroforming system which is represented by a block 28 for the sake of simplicity. The hydroforming reactor system in this case is an Ultraforming system similar to that described in Petroleum Engineer, vol. XXVI, No. 4, April 1954, at page C-35 except that the catalyst is 0.6 wt. percent platinum on a support consisting essentially of 5 wt. percent Zeolon-H (hydrogen form of synthetic mordenite) and 95 wt. percent large pore, relatively pure alumina.

Sufficient nitrogen compound is added to the desulfurized hydroformer feed in line 26 via valved line 29, if necessary, to provide 1 to 100 p.p.m. by weight of combined nitrogen in the feed. In this case, 50 p.p.m. of n- butylamine was added since the desulfurized naphtha contained only traces of nitrogen compounds.

Reformer effluent is passed via line 31, condensor 32 and line 33 into gas-liquid separator 34. Hydrogen-rich gas from separator 34 is recycled via line 36, compressor 37 and line 38 into reformer feed line 27 in an amount of 5,000 s.c.f. per barrel of feed. Excess make gas is withdrawn from line 36 and passed via line 39, compressor 41 and lines 42 and 43 into the desulfurizer feed line 11. Any make-up hydrogen which is needed, such as for start-up, is added via valved line 44 to desulfizer feed line 11. Liquid reformate is withdrawn from the separator 34 via valved line 46.

EXAMPLE

A catalyst was prepared by converting finely divided Zeolon to the hydrogen form, Zeolon-H, by exchanging hydrogen ions for sodium ions in the mordenite according to known techniques, blending the Zeolon-H with high purity alumina gel and impregnating the alumina gel-Zeolon-H blend with an aqueous solution of $$(NH_3)_2Pt(NO_2)_2$$

The impregnated gel-zeolite blend was dried at 250° F. for 16 hours and then pelleted into ⅛ inch long by ⅛ inch diameter cylindrical pellets using Sterotex (hydrogenated coconut oil) as pelleting aid. The pellets were then calcined in air for 6 hours at 1,000° F. Sufficient Zeolon-H and platinum were used to provide 5 wt. percent and 0.6 wt. percent of Zeolon-H and platinum, respectively, in the final catalyst. The catalyst contained no halogen.

Two samples of this catalyst were subjected to comparative hydroforming tests under standardized test conditions employing as feed hydrodesulfurized Mid-Continent virgin naphtha having an ASTM boiling range of about 200–390° F. and being essentially free of nitrogen and sulfur. In one test the nitrogen-free feed was used and in the other test 10 p.p.m. by weight of combined nitrogen as n-butylamine was added to the feed. The tests were made employing 20–25 grams of catalyst in a quasi-isothermal reaction zone immersed in a molten salt bath for temperature control. The test conditions were: a bath temperature of 900° F., a pressure of 250 p.s.i.g., a weight hourly space velocity of 2.3 and a once-through hydrogen rate of 5,000 standard cubic feet per barrel of feet naphtha.

In each test the catalyst activity was calculated as the relative quantity, expressed as a percentage, of an arbitrarily-chosen reference catalyst, containing 0.6 percent platinum on alumina, required to produce a $C_5+$ product fraction having the same octane number from the same Mid-Continent virgin naphtha feed under the same test conditions. The catalyst activity, and the Research octane rating and yield of $C_5+$ reformate products were determined each day. The results were as follows:

TEST A.—NO NITROGEN IN FEED

| Hours on Oil | $C_5+$ Research Octane | $C_5+$Yield, Vol. Percent | Catalyst Activity |
|---|---|---|---|
| 18 | 99.4 | 70 | 267 |
| 42 | 98.3 | 68 | 210 |
| 66 | 98.0 | 70 | 205 |
| 90 | 97.8 | 71 | 195 |

TEST B.—100 P.P.M. BY WT. NITROGEN IN FEED

| Hours on Oil | $C_5+$ Research Octane | $C_5+$Yield, Vol. Percent | Catalyst Activity |
|---|---|---|---|
| 18 | 100.0 | 71 | 292 |
| 43 | | 78 | |
| 68 | 100.8 | 80 | 376 |
| 92 | 100.5 | 78 | 331 |

Thus, surprisingly, the run during which combined nitrogen was present in the feed gave a higher yield of a higher octane product and especially surprisingly also a much higher catalyst activity. These results are contrary to teachings of the prior art using other catalysts, i.e. that nitrogen is a poison to platinum reforming catalyst.

While the invention has been described with reference to certain specific embodiments thereof, it is to be understood that such embodiments are illustrative only and not by way of limitation. Numerous modifications and equivalents of the invention will be apparent from the foregoing description to those skilled in the art and such modifications and equivalents are to be deemed within the scope of the invention.

What is claimed is:

1. An improved naphtha hydroforming process which comprises hydrodesulfurizing feed naphtha to reduce the sulfur content thereof to below about 50 p.p.m. by wt., and produce a desulfurized naphtha, adding 1 to 100 p.p.m. of combined nitrogen to said desulfurized naphtha and contacting said combined nitrogen-containing naphtha in the presence of hydrogen under hydroforming conditions with a catalyst consisting essentially of 0.01 to 10 wt. percent platinum group metal on a support containing 0.1 to 15 wt. percent mordenite and 85 to 99.9 wt. percent alumina, said mordenite having been introduced into said alumina by blending said mordenite in a finely-divided state into a sol of said alumina prior to gelling and drying.

2. The process of claim 1 wherein said combined nitrogen is a basic nitrogen compound.

3. The process of claim 2 wherein said basic nitrogen compound is an amine.

References Cited

UNITED STATES PATENTS

| | | | |
|---|---|---|---|
| 2,758,064 | 8/1956 | Haensel | 208—89 |
| 2,971,904 | 2/1961 | Gladrow et al. | 208—135 |
| 2,984,617 | 5/1961 | De Chellis et al. | 208—89 |
| 3,063,933 | 11/1962 | Meiners | 208—89 |
| 3,301,917 | 1/1967 | Wise | 208—138 |
| 2,906,699 | 9/1959 | Haensel et al. | 208—138 |
| 3,226,339 | 12/1965 | Frilette et al. | 208—138 |
| 3,247,099 | 4/1966 | Oleck et al. | 208—138 |
| 3,251,902 | 4/1966 | Garwood et al. | 208—138 |

HERBERT LEVINE, *Primary Examiner.*

DELBERT E. GANTZ, *Examiner.*

UNITED STATES PATENT OFFICE
CERTIFICATE OF CORRECTION

Patent No. 3,376,214                                  April 2, 1968

Ralph J. Bertolacini et al.

It is certified that error appears in the above identified patent and that said Letters Patent are hereby corrected as shown below:

Column 3, line 10, "components. The hydrogen" should read -- components thereof. The hydrogen --. Column 4, line 17, "to" should read -- for --; line 38, "70-900 p.s.i.g." should read -- 700-900 p.s.i.g. --. Column 5, line 47, "feet" should read -- feed --. Column 6, in the heading to the table, line 1 thereof, "100 P.P.M." should read -- 10 P.P.M. --; same column 6, line 16, "referense" should read -- reference --.

Signed and sealed this 13th day of January 1970.

(SEAL)
Attest:

Edward M. Fletcher, Jr.                          WILLIAM E. SCHUYLER, JR.
Attesting Officer                                   Commissioner of Patents